United States Patent
Dimino et al.

(10) Patent No.: US 12,368,402 B2
(45) Date of Patent: Jul. 22, 2025

(54) POSITION HOLD CONTROL FOR A CONVEYING PROCESS

(71) Applicant: Eaton Intelligent Power Limited, Dublin (IE)

(72) Inventors: Steven Andrew Dimino, Wauwatosa, WI (US); Zhe Zhang, Menomonee Falls, WI (US)

(73) Assignee: Eaton Intelligent Power Limited, Dublin (IE)

( * ) Notice: Subject to any disclaimer, the term of this patent is extended or adjusted under 35 U.S.C. 154(b) by 309 days.

(21) Appl. No.: 18/075,002

(22) Filed: Dec. 5, 2022

(65) Prior Publication Data
US 2024/0186931 A1 Jun. 6, 2024

(51) Int. Cl.
*H02P 23/14* (2006.01)
*B65G 23/00* (2006.01)
*B65G 23/08* (2006.01)

(52) U.S. Cl.
CPC .............. *H02P 23/14* (2013.01); *B65G 23/00* (2013.01); *B65G 23/08* (2013.01)

(58) Field of Classification Search
CPC .......... H02P 23/14; B65G 23/00; B65G 23/08
USPC .................................................. 198/572, 835
See application file for complete search history.

(56) References Cited

U.S. PATENT DOCUMENTS

| | | | |
|---|---|---|---|
| 7,226,310 B1 | 6/2007 | Dickrell et al. | |
| 7,781,996 B2* | 8/2010 | Tajima | H02P 23/14 318/632 |
| 10,044,308 B2* | 8/2018 | Bade | G05B 13/048 |
| 10,608,562 B1* | 3/2020 | Lee | H02P 6/08 |
| 10,983,541 B2 | 4/2021 | Mulcahy | |
| 11,205,979 B2 | 12/2021 | Li et al. | |
| 2006/0293782 A1 | 12/2006 | Rees | |
| 2013/0257339 A1 | 10/2013 | Kim | |
| 2013/0278196 A1* | 10/2013 | Tian | G05B 13/0265 318/430 |
| 2014/0028224 A1* | 1/2014 | Arima | H02P 21/24 318/400.02 |

(Continued)

FOREIGN PATENT DOCUMENTS

| | | | | |
|---|---|---|---|---|
| CN | 111146981 A | * | 5/2020 | ............ H02P 23/14 |
| JP | H0469132 A | | 3/1992 | |

(Continued)

OTHER PUBLICATIONS

M. Gospodinova, European Patent Office, Extended European Search Report in counterpart EP Patent Application No. 23210052.9, mailed Apr. 26, 2024, 9 pages total.

(Continued)

*Primary Examiner* — James R Bidwell
(74) *Attorney, Agent, or Firm* — DiBerardino McGovern IP Group LLC

(57) ABSTRACT

A control apparatus for a conveying system includes: a control module configured to control a power converter coupled to a motor, and a modification module. The modification module is configured to: estimate a size parameter of an item conveyed by the motor, determine if a hold command is received; and if a hold command is received, modify one or more parameters of the control module based on the estimated size parameter of the item to thereby hold a rotor of the motor at a rotor hold position.

20 Claims, 9 Drawing Sheets

(56) References Cited

U.S. PATENT DOCUMENTS

2016/0116896 A1    4/2016  Oonishi
2018/0067086 A1*  3/2018  Tian .................. G01N 29/4454
2021/0159827 A1    5/2021  Pramod

FOREIGN PATENT DOCUMENTS

JP      H07319506 A    12/1995
JP      2009042985 A   2/2009

OTHER PUBLICATIONS

E24 3.0 Card Quick Start Guide, Hytrol Conveyor Company, Inc., available at cdn.hytrol.com/E24_30card.pdf (last accessed Dec. 1, 2022), 4 pages total.
Hall Effect Sensors, Compumotor OEM770T OEM770SD, Servo Drive User Guide, Chapter 5, pp. 107-118, Parker Hannifin Corporation (2000), 12 pages total.

* cited by examiner

POSITION HOLD CONTROL FOR A CONVEYING PROCESS

TECHNICAL FIELD

This disclosure relates to position hold control for a conveying process.

BACKGROUND

An electric motor converts electrical energy into mechanical energy that is provided to a load. More than one electric motor may be driven and controlled by a multi-zone controller, and the motors may be used to drive part of a conveying process.

SUMMARY

In one aspect, a control apparatus for a conveying system includes: a control module configured to control a power converter coupled to a motor; and a modification module. The modification module is configured to: estimate a size parameter of an item conveyed by the motor; determine if a hold command is received; and if a hold command is received, modify one or more parameters of the control module based on the estimated size parameter of the item to thereby hold a rotor of the motor at a rotor hold position.

Implementations may include one or more of the following features.

The modification module may be configured to estimate the size parameter based on a load on the motor while the motor conveys the item. The modification module may be configured to estimate the size parameter based on an amount of direct current (DC) current drawn by the motor while the motor conveys the item.

The size parameter may be weight.

The modification module may be configured to analyze data from a motor sensor after modifying the one or more parameters. The modification module may be configured to determine whether a rotor of the motor is oscillating based on the analysis of the data from the motor sensor. In some implementations, if the rotor is oscillating after the one or more parameters are modified, the modification module is configured to made a second modification to one or more parameters of the control module.

In some implementations, after the one or more parameters of the control module is modified, the item does not move.

The control module may include a proportional-integral (PI) controller, and the parameters may include one or more of an integral windup limit, integral gain coefficient, and a proportional gain coefficient.

The hold command may be received from a host controller.

The control module may be configured to control the power converter by providing a switching signal to the power converter, the switching signal being sufficient to cause the power converter to generate a driving signal that, when applied to the motor, controls one or more of torque, speed, and direction of the motor.

In another aspect, a method includes: generating a motor driver signal for a motor by controlling a power converter with a switching signal, the switching signal being determined by a control scheme associated with one or more control parameters; receiving an indication of a load on the motor as the motor conveys an item through a zone; estimating a size parameter of the item based on the indication of the load; receiving a hold command when the item is at a location in the zone; and after receiving the hold command, modifying one or more of the control parameters based on the estimated size parameter. Modifying the one or more of the control parameters modifies the motor driver signal such that the motor holds the item at the location in the zone.

Implementations may include one or more of the following features.

The indication of the load on the motor may be an amount of direct current (DC) current drawn by the motor as the motor conveys the item through the zone.

In some implementations, after receiving the hold command, indications of a position of a rotor of the motor over time are received; and whether the rotor is oscillating is determined based on the indications of position of the rotor. In some implementations, if the rotor is oscillating, one or more of the control parameters are modified and the item is held at a new location.

In another aspect, a system includes: a power converter configured to drive a motor, the power converter including a plurality of controllable switches; and a control apparatus. The control apparatus includes a control module configured to generate a switching signal for the power converter. When applied to the power converter, the switching signal controls a state of the controllable switches to produce a motor driver signal. The control apparatus also includes a modification module configured to: determine if a hold command is received while the item is at a location in a zone associated with the motor; if a hold command is received: estimate a size parameter of an item conveyed by the motor; and modify one or more parameters of the control module based on the estimated size parameter of the item to modify the motor driver signal such that the motor holds the item at the location.

Implementations may include one or more of the following features.

The control module may be a proportional-integral (PI) controller, and the parameters of the PI controller may be one or more of an integral windup limit, and integral gain coefficient, and a proportional gain coefficient.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1A:
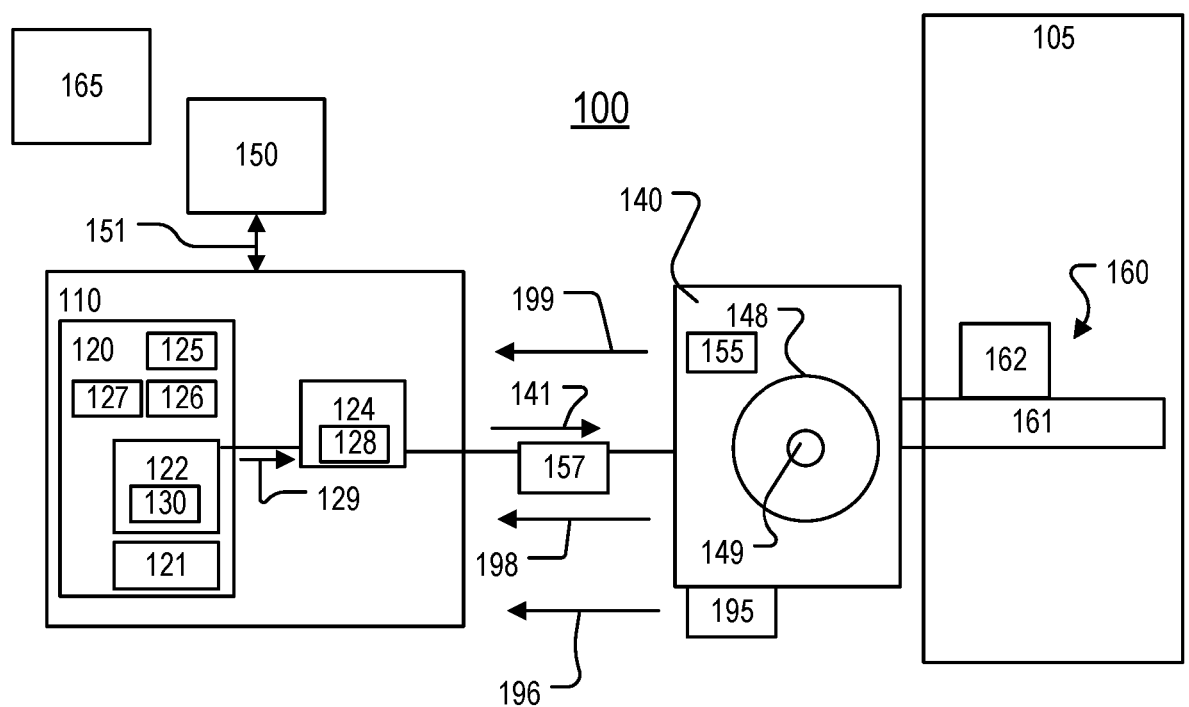
FIG. 1A is a block diagram of a system that includes an example of a conveying system.

Referring to FIG. 1A, a system 100 includes a conveying system 160 that carries an item 162 in a conveying process 105. The conveying process 105 may be an industrial, commercial, or retail process in, for example, a warehouse, a distribution center, a retail center, or a manufacturing facility. The system 100 may be used in other contexts. For example, the conveying system 160 may be part of a heating, ventilation, and air conditioning (HVAC) system, a material handling system, or a pump system.

The system 100 includes a motor drive system 110 that provides a motor driver signal 141 to a motor 140. Applying the motor driver signal 141 to the motor 140 causes the motor 140 to operate at a torque, speed, and direction that depends on characteristics (for example, frequency or duty cycle, polarity, and/or amplitude) of the motor driver signal 141. The conveying system 160 includes a conveyor 161, which may include, for example, conveyor belts and/or rollers. The conveyor 161 is driven by one or more motors, each of which is the same as or similar to the motor 140. The motion of the conveyor 161 is controlled by controlling the torque, speed, and/or direction of the motors.

During ordinary operation, the conveying system 160 operates in an ordinary conveying mode and is called upon to carry a wide range of items under various conditions. For example, a stream of items on the conveyor 161 at a given time may include light weight items (for example, 1 kilogram (kg) or less) and heavy items (for example, 35 kg or more). Furthermore, the conveyor 161 may have a relatively complex configuration that includes horizontal portions and portions that are at an incline (for example, at an incline of +/−5% or at an angle of about +/−3 degrees relative to horizontal).

It may be desirable or necessary to intentionally stop the conveyor 161 by removing the voltage to the motor 140 to, for example, perform maintenance, load the conveyor 161, and/or unload the conveyor 161. The motor drive system 110 may be configured or programmed with a position hold mode. If a position hold command is received while the motor drive system 110 is in the position hold mode, the conveyor 161 is stopped and a position hold is initiated. During the position hold, the item 162 should not move from the location in the conveying system 160 where the item 162 was when the conveying system 160 was intentionally stopped. The location where the item 162 was when the position hold was initiated is referred to as the initial stopping location. During the positon hold, the motor driver signal 141 controls the motor 140 with the goal of holding a rotor 149 of the motor 140 in the position it was in when the position hold was initiated such that the item 162 remains at its initial stopping location.

It can be challenging to hold items of a wide range of weights at their respective initial stopping locations during a position hold if a traditional control scheme is used to control the motor 140. For example, if the motor 140 applies too little torque to the conveyor 161 during the position hold, the item 162 is more easily perturbed from its initial stopping location by gravity and other external forces. If the motor 140 applies too much torque to the conveyor 161 during the position hold, the motor 140 may move item 162 during the position hold. On the other hand, the motor drive system 110 uses an estimate of the weight of the item 162 to modify one or more parameters of a control scheme 130 to more precisely and accurately control the motor 140 and to more reliably hold the item 162 at its initial stopping location. In this way, the control scheme 130 is an adaptive control scheme that adapts to the size (for example, weight) of the item 162.

In greater detail, the motor drive system 110 includes a control apparatus 120 and a power converter 124. The control apparatus 120 includes a modification module 121 that estimates a size parameter (for example, weight) of the item 162. The modification module 121 may estimate the size parameter using measured data, such as, for example, a measurement of the current drawn by the motor 140 while the motor 140 and/or another motor in the conveying system 160 conveyed the item 162 prior to initiation of the position hold. The estimate of the size parameter provides the motor drive system 110 with information about the load on the motor 140 when the position hold is initiated. The information about the load improves the ability of the motor drive system 110 to hold the item 162 at the initial stopping location during the position hold and/or to return the item 162 to the initial stopping location after the item 162 is unintentionally moved from the initial stopping location. For example, the estimate of the size parameter aids in the determination of an appropriate amount of torque that the motor 140 should apply to the conveyor 161 during the position hold.

As compared to traditional approaches that do not account for the size of the item 162, the motor drive system 110 drives the motor 140 in a more precise and efficient manner during the position hold mode and improves the overall performance of the system 100. Moreover, accounting for the size of the item 162 may allow the conveying system 160 to be less complex than a legacy system by, for example, reducing or eliminating the need for physical stops and physical blocking mechanisms on the conveyor 161 that would otherwise be used to hold the item 162 during the position hold. Furthermore, by accounting for the size of the item 162, items of a wide range of sizes are held with minimal or no oscillations during the position hold, even in portions of the conveying system 160 that are not horizontal.

An overview of the system 100 is provided before discussing the approach implemented by the control apparatus 120 in more detail.

Figure 5:
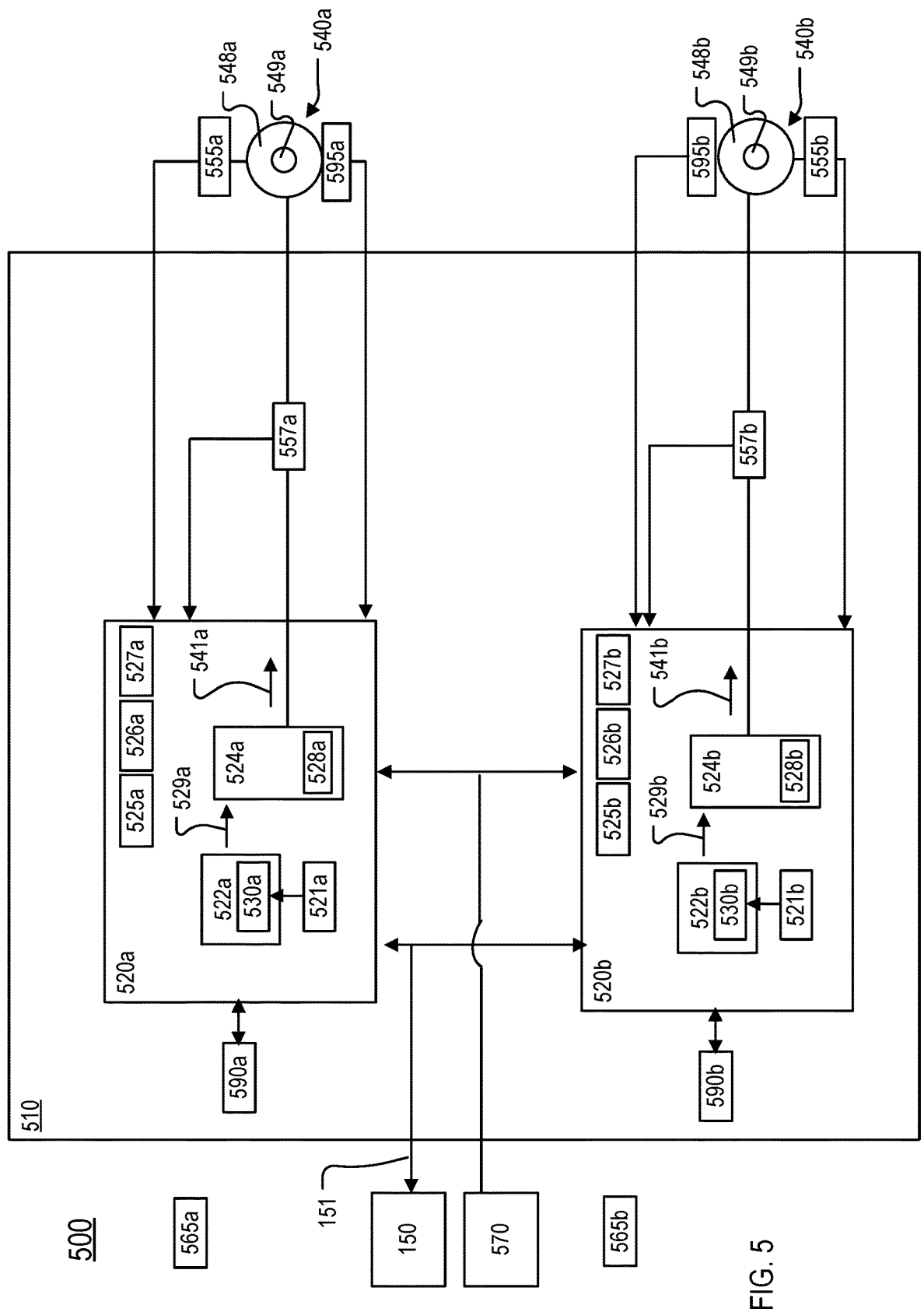
FIG. 5 is a block diagram of a system that includes an example of a dual-zone motor drive system.

The motor 140 may be a direct current (DC) motor or an alternating current (AC) motor. For example, the motor 140 may be a brushless DC motor, a permanent magnet AC motor, or an AC induction motor, just to name a few. The motor 140 may be a three-phase motor or a single-phase motor. In some implementations, the motor drive system 110 is a dual-zone motor drive system, such as shown in FIG. 5.

The motor 140 includes a stator 148 and the rotor 149. The stator 148 includes one winding per phase. The rotor 149 rotates relative to the stator 148 in response to application of the motor driver signal 141. In implementations in which the motor 140 is a three-phase motor, the motor driver signal 141 is a three-phase AC electrical signal, with each phase of the signal 141 being applied to one of three phase windings in the stator 148. The motor driver signal 141 has a voltage and current sufficient to drive the motor 140.

The power converter 124 is any device capable of generating the motor driver signal 141. For example, the power converter 124 may be a variable frequency drive (VFD) or an adjustable frequency drive (AFD). The power converter 124 includes a rectifier that converts alternating current (AC) power from a power source or power grid into direct current (DC) power and an inverter 124 that converters the DC power from the rectifier into alternating current (AC) power. The rectifier may be, for example, a diode bridge rectifier or an active front end (AFE) that includes controllable switches.

The inverter 124 includes a network 128 of controllable switches (for example, transistors). Examples of switches that may be used to form the inverter include, without limitation, metal oxide semiconductor field effect transistors (MOSFET), insulated-gate bipolar transistors (IGBT), Silicon-Carbide (SiC) based MOSFETs or IGBTs, Gallium-Nitride (GaN) based MOSFETs or IGBTs, optical/electrical relays, and/or silicon controlled rectifiers (SCR).

The control apparatus 120 also includes a control module 122 that implements the control scheme 130. The control scheme 130 determines a switching signal 129 that controls the state of the controllable switches in the network 128 to modulate the DC power into the AC motor driver signal 141. For example, the switching signal 129 may control the switches in the network 128 to implement a pulse width modulation (PWM) technique based on any type of control algorithm, such as, for example, a 6-step electronic commutation, various field oriented controls, a space vector PWM, or a sinusoidal PWM. The modulation of the DC power and the characteristics of the motor driver signal 141 (for example, amplitude, polarity, and/or frequency or duty cycle) are controlled by the switching signal 129. The characteristics of the motor driver signal 141 determine the torque, speed, and/or direction of the motor 140.

The control apparatus 120 also includes an electronic processing module 125, an electronic storage 126, and an input/output (I/O) module 127. The control apparatus 120, the control scheme 130, and the modification module 121 are implemented as executable instructions that are stored on the electronic storage 126 and executed by the electronic processing module 125. In some implementations, the electronic processing module 125 and the electronic storage 126 are implemented as a microcontroller.

The electronic processing module 125 includes one or more electronic processors. The electronic processors of the module 125 may be any type of electronic processor, may be multiple types of processors, and may or may not include a general purpose central processing unit (CPU), a graphics processing unit (GPU), a microcontroller, a field-programmable gate array (FPGA), Complex Programmable Logic Device (CPLD), a digital signal processor (DSP), a microcontroller unit (MCU) and/or an application-specific integrated circuit (ASIC).

The electronic storage 126 may be any type of electronic memory that is capable of storing data and instructions in the form of computer programs or software, and may include multiple types of memory. For example, the electronic storage 126 may include volatile and/or non-volatile components. The electronic storage 126 and the processing module 125 are coupled such that the processing module 125 is able to access or read data from and write data to the electronic storage 126.

The I/O interface 127 may be any interface that allows a human operator, an external device (such as a host controller 150), and/or an autonomous process to interact with the control apparatus 120. The I/O interface 127 may include, for example, audio input and/or output (such as speakers and/or a microphone), visual output (such as lights, light emitting diodes (LED)), serial or parallel port, a Universal Serial Bus (USB) connection, and/or any type of network interface, such as, for example, Ethernet. The I/O interface 127 also may allow communication without physical contact through, for example, an IEEE 802.11, Bluetooth, cellular, or a near-field communication (NFC) connection. The motor drive system 110 may be, for example, operated, configured, modified, or updated through the I/O interface 127.

The system 100 also includes a host controller 150 and a sensor system 165. The host controller 150 communicates with the motor drive system 110 to control various aspects of the motor drive system 110. For example, the host controller 150 may issue a command to the motor drive system 110 to place the motor drive system 110 in the position hold mode and to initiate a position hold while the motor drive system 110 is in the position hold mode. The host controller 150 is an electronic controller that includes an electronic processing module, an electronic storage, and an input/output (I/O) interface. The host controller 150 may be implemented as, for example, a microcontroller or any type of a computer.

The motor drive system 110 communicates with the host controller 150 via a communications link 151. The communications link 151 is any type of wired or wireless bi-directional combinations path. For example, the communications link 151 may allow data and commands to be exchanged via, for example, an automation protocol (such as, for example, Fieldbus or Modbus), TCP/IP, a protocol based on the IEEE 801.11 standard (WiFi), any IP-based protocol that is capable of transmitting 3G, 4G, 5G data), Bluetooth, or any other communications protocol that is capable of exchanging data and information.

The sensor system 165 monitors the conveying system 160. The sensor system 165 may include any kind of sensor, for example, the sensing system 165 may include optical, radio-frequency (RF), and/or electrical sensors, just to name a few. The system 100 also includes various sensors that measure quantities related to the motor 140 including a motor sensor 195, a sensor system 157, and an output sensor 155.

The motor sensor 195 monitors operating characteristics of the motor 140 and provides data or an indicator 196 to the control apparatus 120. The data 196 includes information about the monitored operating characteristics of the motor 140. The motor sensor 195 may include electrical and/or environmental sensors. Examples of electrical sensors include, without limitation, current sensors, power sensors, and voltage sensors. Examples of environmental sensors include, without limitation, temperature sensors (such as thermocouples) and moisture sensors.

The motor sensor 195 measures information about the motor 140 while the motor 140 operates and provides the information to the control apparatus 120. For example, the motor sensor 195 may include a current sensor that measures the amount of DC current that the motor 140 draws while conveying the item 162 and provides an indication 196 of the amount of measured current to the control apparatus 120. In another example, the motor sensor 195 may provide an indication 196 of another quantity from which the DC current may be derived. Examples of measurements from which the amount of DC current drawn by the motor 140 to convey the item 162 may be derived include voltage measurements and temperature measurements.

The sensor system 157 monitors the motor driver signal 141. The sensor system 157 includes one or more sensors that are capable of measuring an electrical quantity such as, for example, voltage, power, and/or current. Examples of sensors that may be used in the sensor system 157 include, without limitation, a Rogowski coil, a Hall effect sensor, a voltage sensor and/or a shunt resistor that measures the voltage across an element (such as a resistor) that has a known impedance. The sensor system 157 may include one sensor per phase such that in a three-phase system, the sensor system 157 includes three sensors. The sensor system 157 produces an indication 198 of the amount of an electrical quantity in the motor driver signal 141 at a point in time and provides the indication 198 to the control apparatus 120.

The output sensor 155 measures the speed and/or position of the rotor 149 and/or produces data from which the speed and/or position of the rotor 149 may be derived and provides an indication 199 to the control apparatus 120. The output sensor 155 may be, for example, a sensor, such as an encoder, that measures the speed and/or position of the rotor 149. In some implementations, the output sensor 155 includes a plurality (for example, three) Hall effect sensors or other types of sensors. In these implementations, the three sensors transmit a unique pattern of signals for each of a plurality of angular positions of the rotor 149 to provide a measure of the position of the rotor 149. The number of angular positions of the rotor 149 represented by the patterns depends on the specific configuration of the motor 140. The number of different angular positions of the rotor 149 represented by the patterns may be, for example, between 3 and 360 and may be an integer multiple of the number of Hall effect sensors in the output sensor 155.

Figure 1B:
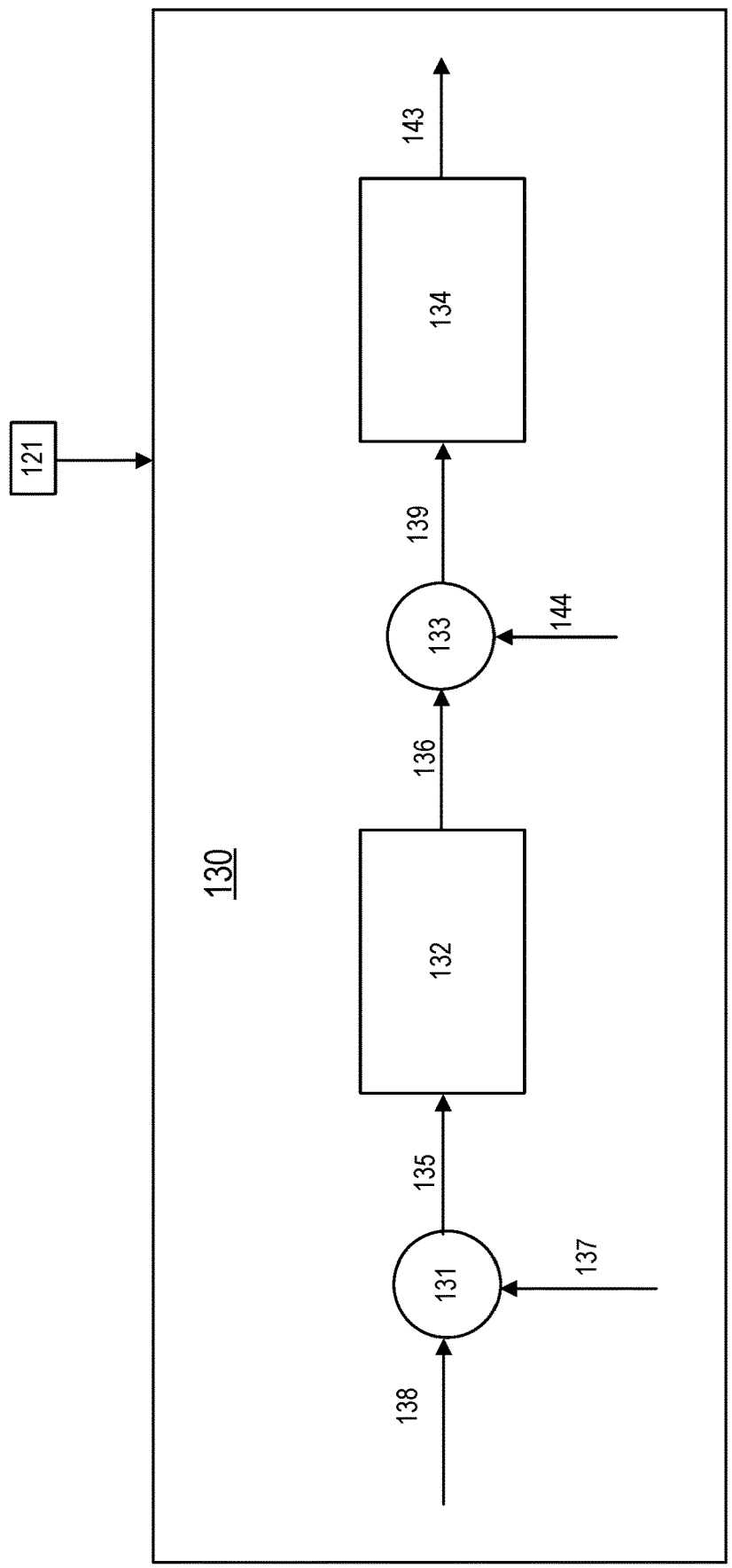
FIG. 1B is a block diagram of an example of a control scheme for holding a rotor during a position hold.

FIG. 1B is a block diagram of an example of an implementation of the control scheme 130 for holding the position of the rotor 149 at a rotor hold position 138 during a position hold that is initiated while the control apparatus 120 is in the position hold mode. The control scheme 130 is implemented as a collection of executable instructions that are stored on the electronic storage 126. The rotor hold position 138 is the angular position of the rotor 149 when the position hold command is initiated. The control scheme 130 uses an outer loop proportional-derivative (PD) position controller and an inner loop proportional-integral (PI) controller to generate an output 143. The output 143 represents a PWM signal for driving the motor 140 to maintain the rotor 149 at the hold position 138. The output 143 is used to produce the switching signal 129.

The control scheme 130 includes a comparator 131, a position control block 132, a comparator 133, and a speed control block 134. The comparator 131 determines a rotor position error 135 by comparing a measured position 137 of the rotor 149 to the rotor hold position 138. The measured position 137 of the rotor 149 may be a direct measurement from the motor sensor 195.

The position control block 132 is a proportional-derivative (PD) controller that generates the speed reference 136 from the rotor position error 135. The discrete time-domain form of the position control block 132 is shown in Equation (1):

$$u(k) = Ae(k) + \left(P\left(1+N\frac{T_s}{2}\right)^{-1}\left(N\frac{T_s}{2}-1\right) - A\right)e(k-1) - Bu(k-1), \quad \text{Equation (1)}$$

where k is an integer number that indexes the time step, u(k) is the speed reference 136 at the time step k, u(k−1) is the speed reference 136 at the time step immediately before the time step k, e(k) is the rotor position error 135 at the time step k, e(k−1) is the value of the rotor position error 135 at the time step immediately before the time step k, P is the proportional gain of the PD controller 132, N is the filter coefficient, Ts is the duration of the time step between k and k−1, u(k−1) is the speed reference 136 at the time step immediately before the time step k, A is the quantity shown in Equation (2), and B is the quantity shown in Equation (3). The term A in Equation (1) is expressed as shown in Equation (2):

$$A = DN\left(1+N\frac{T_s}{2}\right)^{-1}, \quad \text{Equation (2)}$$

and the term B in Equation (1) is expressed as shown in Equation (3):

$$B = \left(1+N\frac{T_s}{2}\right)^{-1}\left(N\frac{T_s}{2}-1\right). \quad \text{Equation (3)}$$

The variables D, N, Ts, and k represent the same quantities in Equations (2) and (3) as they do in Equation (1). The variables D, N, and Ts are examples of control parameters of the PI control block 132.

The comparator 133 compares the speed reference 136 to the measured rotor speed 144. The measured rotor speed 144 may come from the output sensor 155. The output of the comparator 133 is a speed error 139. The value of the speed error 139 is zero when the rotor 149 is held at the rotor hold position 138. The speed error 139 is provided to the speed control block 134. The speed control block 134 seeks to hold the rotor 149 at a zero velocity and the output 143 is the PWM equivalent of a DC voltage that will hold the rotor 149 at the rotor hold position 138 or return the rotor 149 to the rotor hold position 138 if the rotor 149 has moved. The discrete time-domain form of the speed control block 134 is shown in Equation (4):

$$u(k)=u(k-1)+(K_P+K_iT_S)e(k)-K_Pe(k-1) \quad \text{Equation (4),}$$

where k is an integer number that indexes the time step, u(k) is the output 143 at the time step k, u(k−1) is the output 143 at the time step k immediately before the time step k, e(k) is the speed error 139 at the time step k, e(k−1) is the speed error 139 at the time step immediately before the time step k, Ki is the integral gain coefficient of the PI controller, and Kp is the proportional gain coefficient of the PI controller. The integral gain coefficient (Ki) and the proportional gain coefficient (Kp) are examples of control parameters of the control scheme 130.

The modification module 121 estimates a size parameter of the item 162 and modifies one or more of the control parameters of the control scheme 130 based on the estimated size parameter.

Figure 2:
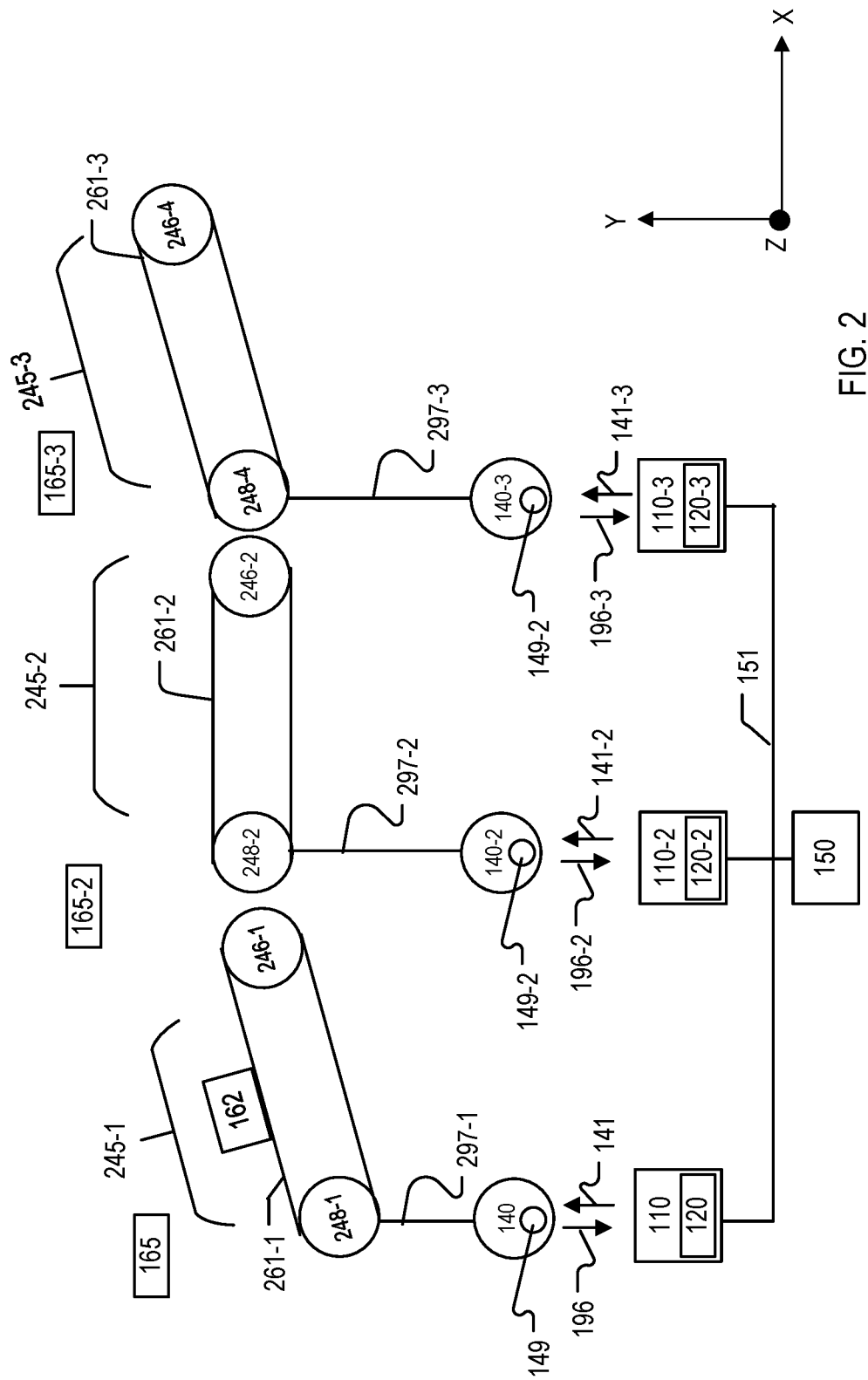
FIG. 2 is a block diagram of an example of a conveying system.

FIG. 2 is a block diagram of an example of a conveying system 260. The conveying system 260 includes zones 245-1, 245-2, and 245-3. The zone 245-1 includes rollers 248-1 and 246-1 and a conveyor belt 261-1. The motor 140 is connected to the roller 248-1 by a mechanical link 297-1. The mechanical link 297-1 is any device or system that transfers the output of the motor 140 to the roller 248-1. For example, the mechanical link 297-1 may be a shaft. When the motor 140 receives the motor driver signal 141 from the control apparatus 120, the motor 140 operates at a velocity, torque, and direction specified by the motor driver signal 141 and causes the roller 248-1 to rotate in the X-Y plane. The roller 248-1 and a roller 246-1 make physical contact with a belt 261-1. The belt 261-1 is a continuous piece of flexible material that encircles the rollers 248-1 and 246-1. When the rollers 248-1 and 246-1 rotate, the belt 261-1 moves in a loop. In this way, the item 162 is conveyed through the zone 245-1.

The zone 245-2 includes rollers 248-2 and 246-2 and a belt 261-2. The roller 248-2 is driven by a motor 140-2, which is controlled by a control apparatus 120-2. The zone 245-3 includes rollers 248-3 and 246-3 and a belt 261-3. The roller 248-3 is driven by a motor 140-3, which is controlled by a control apparatus 120-3. The motors 140-2 and 140-3 have the same features as the motor 140. The control modules 120-2 and 120-3 have the same features as the control apparatus 120. The zones 245-1, 245-2, and 245-3 are positioned relative to each other such that the item 162 may be conveyed through the entire conveying system 160 by moving from zone to zone.

The conveying system 260 also includes the sensor system 165 and similar sensor systems 165-2 and 165-3. The sensor systems 165, 165-2, 165-3 sense when the item 162 enters or is nearing a particular one of the zones, and when the item 162 leaves a zone. The sensor systems 165, 165-2, 165-3 may be, for example, optical sensors that detect when the item 162 passes a particular point in the conveying system 260. Each of the sensor systems 165, 165-2, 165-3 may provide information about the location of the item to the host controller 150 and/or to the control modules 120, 120-2, 120-3.

The conveying system 260 includes three zones 245-1, 245-2, 245-3. However, the conveying system 260 may be configured with more or fewer zones. Furthermore, in the implementation shown, the belt 261-1 of the zone 245-1 has a negative incline relative to horizontal (the X axis in this example), the belt 261-2 of the zone 245-2 is horizontal, and the belt 261-3 of the zone 245-3 is at a positive incline relative to horizontal. Other configurations are possible. For example, all of the zones 245-1, 245-2, 245-3 may be horizontal. Furthermore, the conveying system 260 may be configured to operate with dual-zone controllers, each of which drives two zones. An example of a dual-zone controller that includes an implementation the modification module 121 is shown in FIG. 5.

Figure 3:
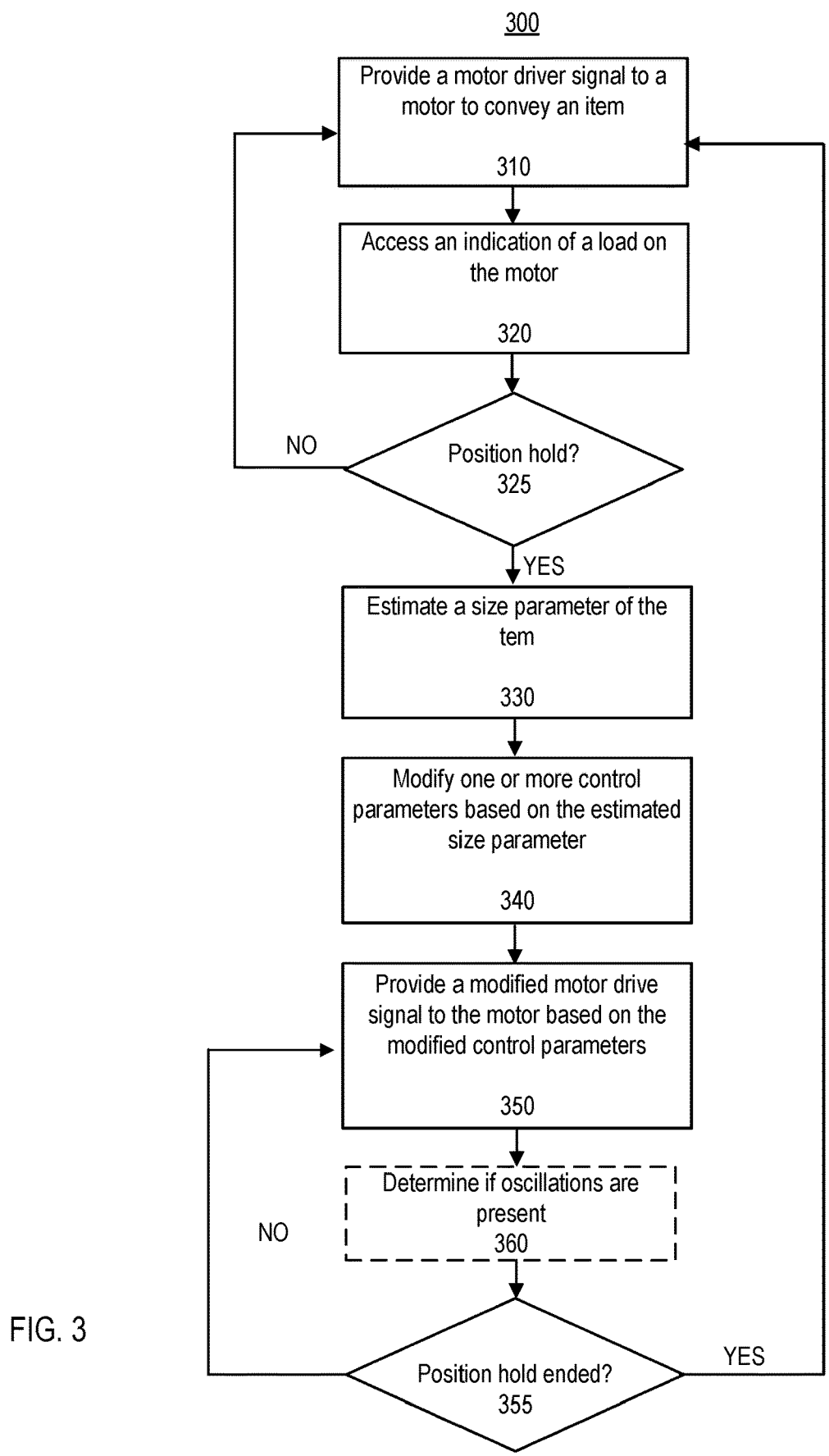
FIG. 3 is a flow chart of an example of a process for a conveying system.

FIG. 3 is a flow chart of a process 300 for a conveying system. The process 300 is discussed with respect to the conveying system 260 (FIG. 2) and the control apparatus 120 (FIGS. 1A and 2). However, the process 300 may be performed on any conveying system that is driven by one or more motors.

The motor drive system 110 provides the motor driver signal 141 to the motor 140 while the conveying system 260 is in the ordinary conveying mode (310). The rotor 149 rotates in response to the motor driver signal 141. The rotor 149 drives the link 297-1 to rotate the roller 248-1 and convey the item 162 through the zone 245-1. The speed and direction of the rotor 149, and the torque that the rotor 149 applies to the link 297-1, are dictated by the characteristics of the motor driver signal 141.

The item 162 loads the motor 140 as the belt 261-2 conveys the item 162 through the zone 245-1. The motor sensor 195 (FIG. 1A) measures operating properties of the motor 140 as the item 162 moves through the zone 245-1 and produces the data or indication 196 (FIG. 1A). The control apparatus 120 accesses the indication 196 (320). The indication 196 may be accessed by the control apparatus 120 in a variety of ways. For example, in some implementations, the motor sensor 195 provides the indication 196 to the control apparatus 120 only when the motor 140 is conveying an item through the zone 245-1. In some implementations, the control apparatus 120 polls or requests the indication 196 from the motor sensor 195 in response to a command from the host controller 150. In some implementations, the motor sensor 195 provides the indication 196 to the control apparatus 120 regularly or periodically while the conveying system 160 is in the ordinary conveying mode regardless of whether or not an item is in the zone 245-1. In these implementations, the indication 196 includes a no-data or null marker when the motor 140 is not operating.

The indication 196 may be saved on the electronic storage 126 for later analysis. Moreover, multiple instances of the indication 196 for the same item may be saved on the electronic storage 126. For example, the control apparatus 120 may receive a plurality of indications 196 of the DC current drawn by the motor 140 as the item 162 moves through the zone 245-1. In these implementations, each indication 196 may be stored in association with a time stamp or other unique characteristic to distinguish it from other indications.

A stop command from the host controller 150 may initiate a position hold in any or all of the zones 245-1, 245-2, 254-3 if the control module 120 is configured for the position hold mode. The initiation of the position hold ends the ordinary conveying mode. If the control module 120 is configured for the position hold mode, the host controller 150 may initiate a position hold by providing a position hold command to the control apparatus 120. Alternatively, an operator of the conveying system 160 may initiate the position hold via the control apparatus 120 I/O interface 127 (FIG. 1A).

If the host controller 150 issues a stop command and the position hold mode is not configured, the position hold is not initiated at (325), the voltage is removed from the motor 140 and it may coast to a stop, leaving the roller 248-1 free to rotate. The roller 248-1 may stop, causing the conveyor zone 245-1 to also stop. The process 300 may end, or the process 300 may return to (310) such that the conveying system 260 resumes operation in the ordinary conveying mode and voltage is again applied to the motor 140. In an implementation in which the conveying system 260 moves items generally in the Y direction in the ordinary conveying mode, the item 162 moves through the zone 245-1 and into the zones 245-2 and 245-3.

If the position hold mode is configured, a position hold is initiated (325) in response to a stop or hold command, and a size parameter of the item 162 is estimated based on the indication 196 (330). For example, the modification module 121 may estimate the weight of the item 162 from the amount of DC current that the motor 140 drew while moving the item 162 through the zone 245-1. The amount of DC current that the motor 140 draws while moving the item 162 through the zone 245-1 depends on the physical properties (for example, diameter and weight) of the rollers 248-1 and 246-1, the size of the rotor 149, the characteristics (for example, the friction coefficients and/or incline) of the belt 261-1, and the electrical profile (for example, rated voltage, current, frequency, and/or horsepower of the motor 140). The relationship between weight of a conveyed item and the DC current drawn by the motor 140 while conveying the item may be stored on the electronic storage 126 as a look-up table, database, or a function that implements a mathematical relationship. In implementations that use a look-up table, the data in the table may be collected prior to using the conveyor system 260 from actual and/or simulated data collected under conditions similar to those experienced in operational use of the conveyor system 260. In implementations that use a function to implement a mathematical relationship between DC current drawn by the motor 140 and item weight, the mathematical relationship may be derived from actual and/or simulated data collected under conditions similar to those experienced in operational use of the conveyor system 260. The look-up table, database, or function may be stored on the electronic storage 126 by the manufacturer of the motor drive system 110. In some implementations, the look-up table, database, and/or function may be modified via the I/O interface 127.

The estimated size parameter may be a value, such as an estimated weight of the item 162. In other implementations, the estimated size parameter may be a descriptor, such as "small", "medium", and "large." In this implementation, each descriptor is associated with a pre-defined range of weights.

In some implementations, the control apparatus 120 is able to access indications measured by other control modules that control other zones in the conveying system 260. For example, in an implementation of the conveying system 260 in which items are conveyed generally in the −Y direction during the ordinary conveying mode, the host controller 150 may provide the control apparatus 120 with an indication of the load on the motor 140-2 that was measured while the motor 140-2 conveyed the item through the zone 245-2.

One or more aspects of the control scheme 130 are adjusted based on the estimated size parameter of the item 162 (340). The aspects include control parameters and/or the output 143. The control parameters are any of the coefficients or terms that are used to define the speed control block 134 or the position control block 132. Examples of control parameters include, without limitation, an integrator wind-up threshold of the speed control block 134, the proportional gain coefficient (Kp) of the speed control block 134, the integral gain coefficient of the speed control block (Ki), and/or the proportional gain (D) of the position control block 132. Additionally or alternatively, one or more characteristics of the output 143 may be directly limited based on the estimated size of the item 162. For example, the output 143 may be limited in a manner that changes the duty cycle of the motor driver signal 141.

The example of modifying the integrator wind-up threshold of the speed control block 134 based on the estimate of the size parameter of the item 162 is discussed next. As discussed above, the speed control block 134 is a PI controller. Equation (4) shows the speed control block 134 in discrete time form, but the speed control block 134 also may be expressed as a summation of a proportional term (P) and in integral term (I), as shown in Equation (5):

$$u(t)=P+I=K_p e(t)+K_i \int_0^t e(\tau)d\tau \quad \text{Equation (5),}$$

where u is the control variable (the output 143 in this example), P is a proportional term, I is an integral term, Kp is the proportional gain coefficient, Ki is the integral gain coefficient, and e is the error (the speed error 139 in this example). The terms Kp, Ki, and e are the same as in Equation (4).

As discussed above, the error term (e) is the difference between the speed reference 136 from the position control block 132 and the measured speed 144. The proportional term P is proportional to the current value of the speed error 139. The integral shown in the right-most term of Equation (5) accounts for past values of the speed error 139 and integrates them over time to produce the integral term I. For example, if there is residual speed error that remains after the motor driver signal 141 is applied to the motor 140, the integral term (I) seeks to eliminate this residual error by adding a control effect due to the cumulative value of the error. When the error is eliminated or reduced, the integral term (I) does not increase. However, if the residual error is large and/or persistent, the integral term (I) continues to increase and the large integral term (I) may drive the value of the control variable (the output 143) to a point where the motor 140 cannot be driven to meet the output 143. For example, the output 143 may correspond to a switching signal 129 that drives the inverter 124 to produce a motor driver signal 141 that attempts to drive the motor 140 at a torque that the motor 140 is incapable of producing. When the integral term (I) is in this condition, the speed control block 134 has integral windup.

To avoid integral windup or to mitigate the effects of integral windup, the value of the integral term (I) is limited or modified based on the estimated size parameter of the item 162. For example, the integral term (I) and/or the integral gain coefficient (Ki) may have a maximum value or limit that varies with the estimated size parameter. In some implementations, the electronic storage 126 stores a look-up table or database that associates the maximum value of the integral term (I) and/or the maximum value of the integral gain coefficient (Ki) with each of a plurality of size parameters. In some implementations, the maximum value or limit on the integral term (I) and/or the integral gain coefficient (Ki) is determined from a mathematical relationship that relates the size parameter to the maximum value or limit on the integral term (I) and/or the integral gain coefficient (Ki). The mathematical relationship may be based on empirical data.

Additional or other parameters of the control scheme 130 may be modified based on the estimated size parameter of the item 162. For example, the proportional term Kp of the speed controller 234 may be set based on the size parameter. The relationship between the proportional term Kp and the estimated size parameter of the item 162 may be stored in a look-up table or data base on the electronic storage 126, or may be based on a mathematical relationship. For example, the proportional term Kp may be increased (for example, by a factor of 4) when the item 162 has a size parameter that is associated with a large (or heavy) item. Increasing the proportional term Kp causes the output 143 to increase when the position error 135 is indicated by the comparator 131. The larger output 143 causes the motor 140 to output more torque.

Moreover, other aspects of the control scheme 130 in addition to or other than the control parameters may be modified for the position hold. For example, the characteristics of the output 143 may be modified based on the size parameter of the item 162. Setting the one or more control parameters based on the estimated size parameter of the item 162 improves the ability of the control apparatus 120 to hold the item 162 still during the position hold.

After the aspect(s) of the control scheme 130 are modified or set, the control scheme 130 generates the output 143 to produce the switching signal 129 that controls the switches 128 in the inverter 124, which produces the motor driver signal 141 such that the item 162 is maintained at the initial stopping location during the position hold (350). The indication 199 from the motor output sensor 155 (FIG. 1A) and/or the indication 198 from the sensor system 157 (FIG. 1A) is used to generate updated measured input values for the control scheme 130, namely the updated measured position 137 of the rotor 149 and the measured rotor speed 144. The position 137 and the speed 144 may be direct measurements 199 from the output sensor 155 or may be estimated using a sensor-less technique using the data 198 from the sensor system 157.

The process 300 also may determine whether the rotor 149 is oscillating (360) based on the analyzing the data 199 from the output sensor 155. During the position hold, the motor driver signal 141 drives the motor 140 such that the rotor 149 remains stationary and the item 162 also remains stationary. The precision and control of the motor 140 is enhanced due to the use of the estimated size parameter, but the rotor 149 may still oscillate under some conditions.

Thus, the process 300 optionally includes the oscillation detection at (360) to further stabilize the rotor 149 and the item 162.

As discussed above, the output sensor 155 may include three Hall sensors that collectively produce a signal that represents which one of a plurality of possible discrete angular positions the rotor 149 is in. The direction of rotation of the rotor 149 as well as the presence of oscillation of the rotor 149 may be determined by analyzing the data 199 over time. For example, by comparing a series of measured angular positions of the rotor 149, the direction of rotation (clockwise or counterclockwise in the X-Y plane of FIG. 2) can be determined. If the data 199 indicates that the rotor 149 is moving in both the clockwise and counterclockwise directions, rotor 149 oscillation is likely present. To address the oscillations, the modification module 121 may reset one or more aspects of the control scheme 130 to bring it to a more stable state. For example, the modification module 121 may reset the integral term (I) of the speed control block 134 such that the control apparatus 120 then acts to hold the item 162 and the rotor 192 at a new position with a motor control signal 141 at a zero PWM duty cycle. The integral term (I) may be reset by setting the integrator memory state to zero, for example, by setting the term u(k−1) of Equation (4) to zero.

The process 300 may be implemented with or without the oscillation detection (360). Moreover, the oscillation detection (360) may be conditionally invoked. In some implementations, the oscillation detection (360) is only performed when the item 162 being held has a certain estimated size parameter and/or has experienced particular conditions. For example, in some implementations, the oscillation detection (360) is performed only on items estimated to have a size parameter of "small" or are estimated to be less than a certain weight and that have been perturbed from their initial stopping location.

The control scheme 130 continues to produce the updated output 143 (430) to hold the item 162 at its initial stopping location while the position control is in place. The position hold may be ended by a command from the host controller 150. If the position hold ends (355), and if the conveying system 260 has been returned to the ordinary conveying mode, the process 300 returns to (310). Otherwise, the process 300 ends and the conveying system 260 stops operating.

Other implementations of the process 300 are possible. For example, in the example of FIG. 3, the process 300 is configured such that the control apparatus 120 estimates the size parameter of the item 162 after the position hold is initiated. This approach can reduce computational processing and increase the speed and efficiency of the control apparatus 120. However, in other implementations, the size parameter of the item 162 is estimated any time that the control apparatus 120 accesses the indication 197, regardless of whether or not the position hold has been initiated. In these implementations, the estimate of the size parameter is stored on the electronic storage 126 and is accessed by the modification module 121 after initiation of the position hold.

Furthermore, the process 300 may be implemented to only include the aspects performed during the position hold, which are (330)-(360) in this example. In implementations in which the process 300 only includes the aspects performed during the position hold, the process 300 is only invoked with the position hold is initiated and the process 300 does not include (310) or (320). In these implementations, the indication of the load on the motor 140 is provided to the process 300 as an input variable and the process 300 ends when the position hold mode ends instead of returning to (310).

Figure 4A:
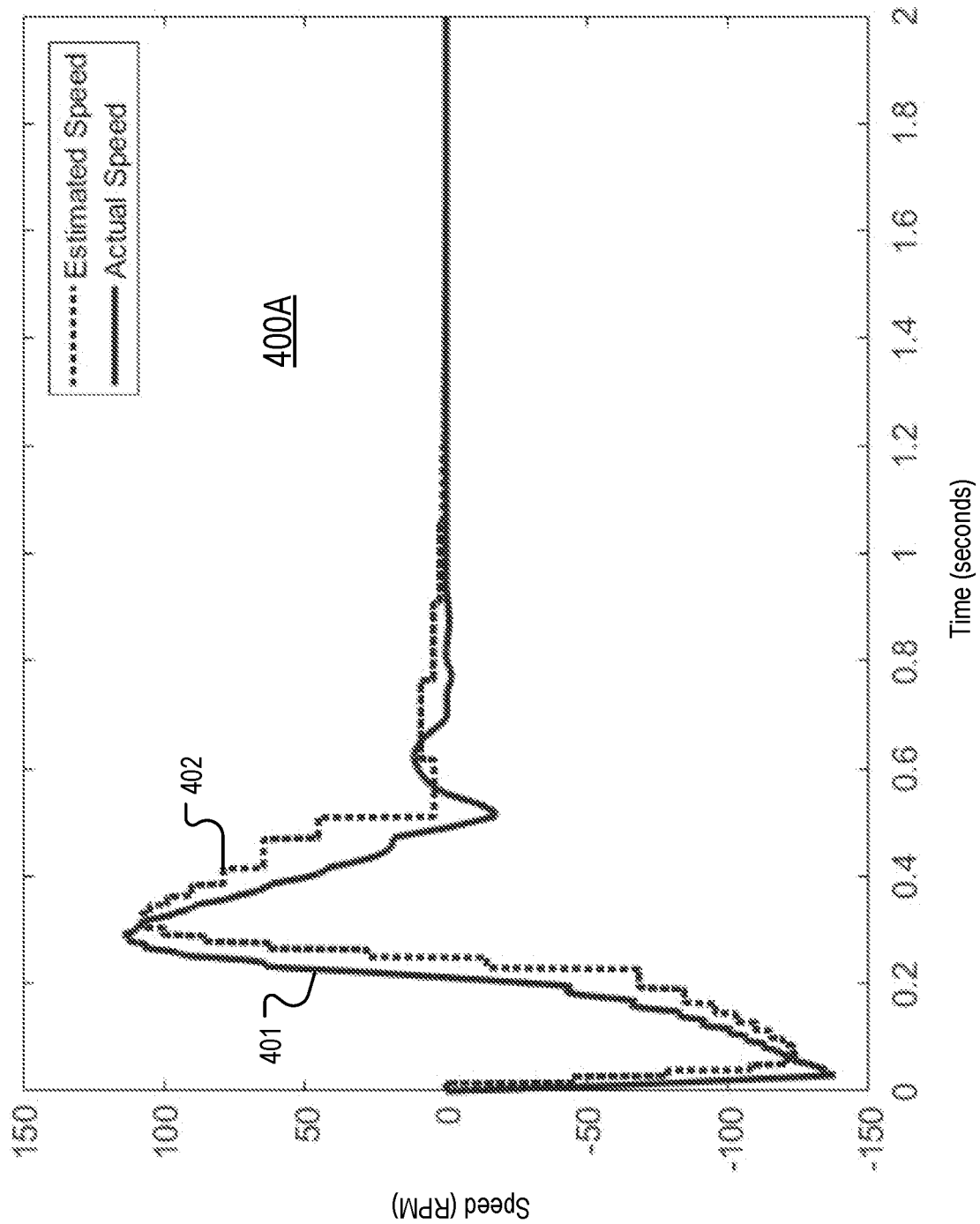
FIGS. 4A-4D show simulated data.
Figure 4B:
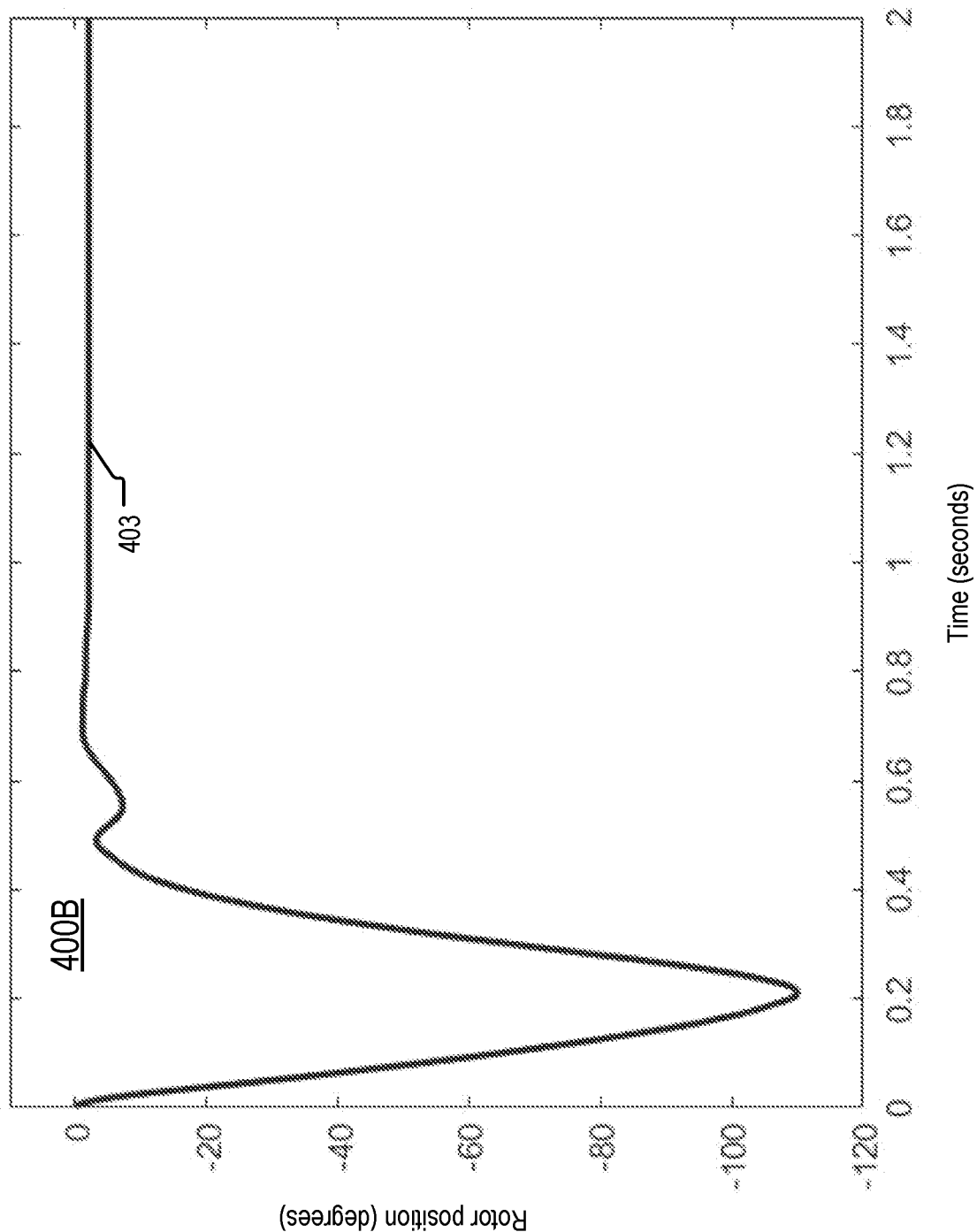
Figure 4C:
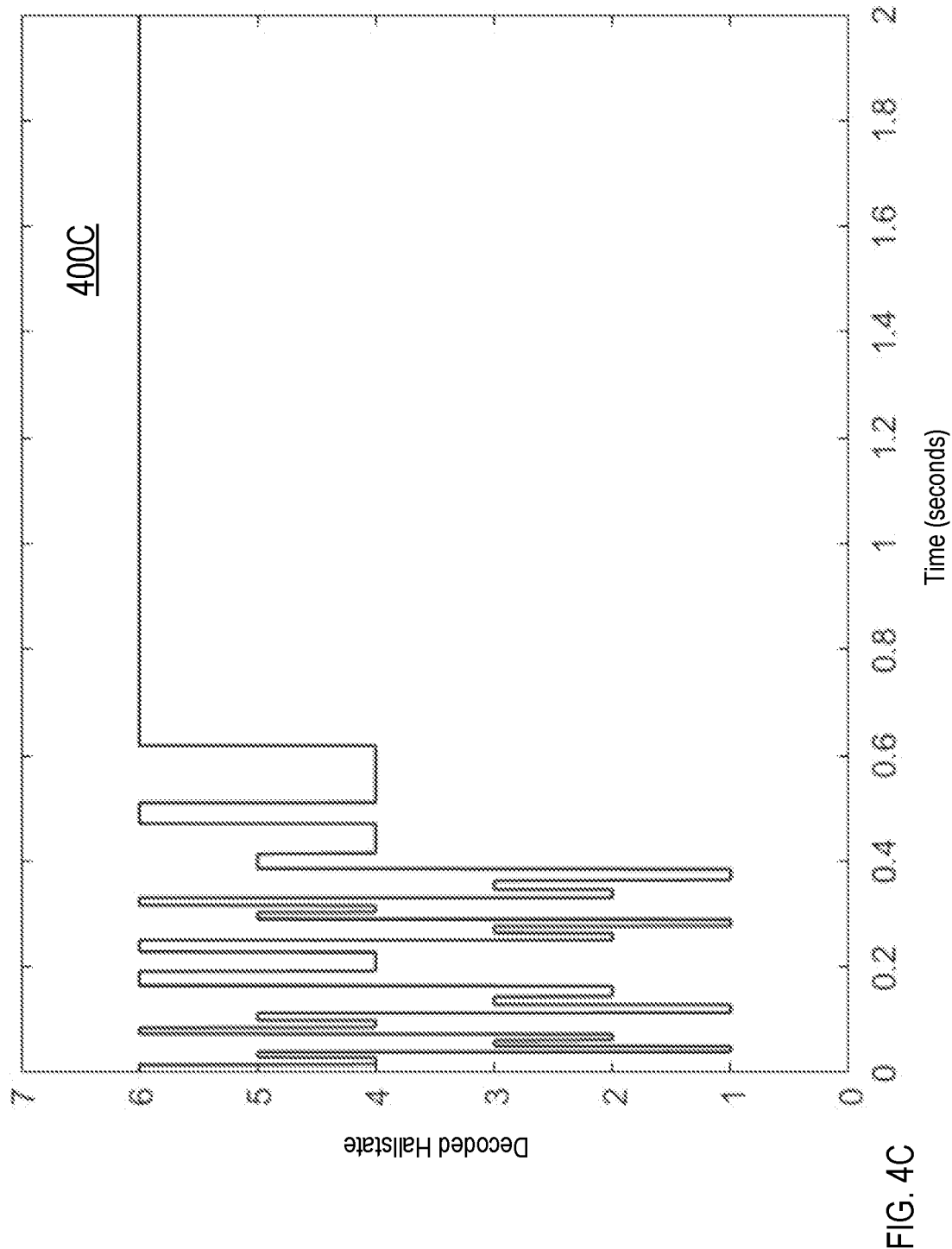
Figure 4D:
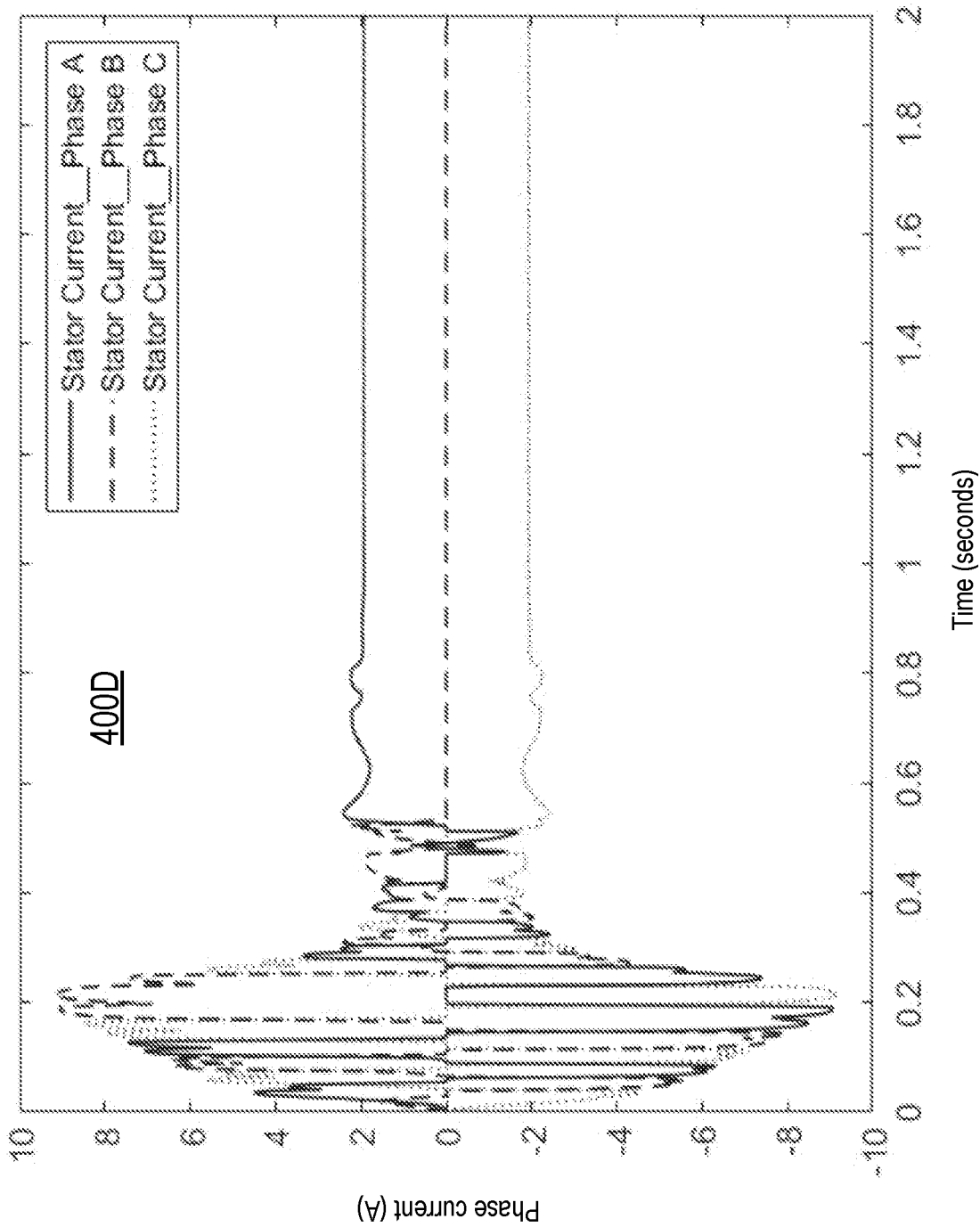

FIGS. 4A-4D show simulated results for the control apparatus 120 with the modification module 121 acting to hold an item during a position hold. The simulation included a three-phase permanent magnet motor with a constant load of 1 Newton-meter (N-m) applied on its shaft to emulate the item conveyed. In the simulation, the item conveyed was a "large" item that had a DC current draw of 1.92 A. All of the simulated data in FIGS. 4A-4D is plotted as a function of the same time scale. FIG. 4A shows the speed of the rotor 149 as a function of time in seconds (s), with the data 401 (solid line style) being the measured speed (for example, from the output sensor 155) and the data 402 (dashed line style) being the estimated speed (for example, the speed reference 136). FIG. 4B shows the angular position of the rotor 149 (for example, as measured by the motor sensor 195) as a function of time. FIG. 4C shows the decoded hallstate from the three separate hall sensors (which indicates a discrete position of the rotor 149) from the motor sensor 195 as a function of time. FIG. 4D shows measured current in amperes (A) for each phase (phase A, phase B, phase C) of the motor as a function of time.

As shown in FIG. 4B, just after time 0 seconds (s), the rotor 149 is perturbed and driven away from its initial position. A position hold is initiated at about time 0.02 seconds (s) to bring the rotor 149 back to its initial position. The control apparatus 120 responds by energizing the motor 140, as shown by the currents in FIG. 4D changing after time 0. The velocity of the rotor 149 (FIG. 4A) is controlled to bring the item back to its initial hold position. At around time=0.75 s, the item 162 and rotor 149 have been returned to their respective initial positions and remain at a standstill.

As discussed above, the control apparatus 120 may be implemented as part of a dual-zone motor controller. A dual-zone controller controls two motors and is capable of controlling two zones of a conveying system. Referring to the conveying system 260 of FIG. 2, a dual-zone motor controller could, for example, drive the motor 140 and the motor 140-2 to thereby control the zones 245-1 and 245-2.

FIG. 5 is a block diagram of a system 500 that includes a dual-zone motor drive system 510. The dual-zone motor drive system 510 implements the modification module discussed above to more precisely hold items still in either or both of two zones of a conveying system during a position hold.

The dual-zone motor drive system 510 includes a first motor control apparatus 520a and a second motor control apparatus 520b. The first motor control apparatus 520a includes a first control module 522a, a first modification module 521a, and a first power converter 524a. The second motor control apparatus 520b includes a second motor control module 522b, a second modification module 521b, and a second power converter 524b. The control modules 522a, 522b implement respective control schemes 530a, 530b. The modification modules 521a, 521b implement the process 300 (FIG. 3) and are similar to the modification module 121 (FIG. 1A).

The first control module 522a includes a control scheme 530a that produces a switching signal 529a. The switching signal 529a controls the power converter 524a to produce a motor driver signal 541a that drives a motor 540a. The second control module 522b includes a control scheme 530b that produces a switching signal 529b. The switching signal 529b controls the power converter 524b to generate a motor driver signal 541b that drives a motor 540b. The motors 540a and 540b are similar to the motor 140 and include respective stators 548a, 548b and rotors 549a, 549b.

The first modification module 521a estimates a size parameter of an item conveyed by the motor 540a based on measurements from a motor sensor 595a. The dual-zone motor control apparatus 520 is configured for the position hold mode. When the dual-zone motor control apparatus 520 is in the position control mode and a position hold is initiated, the first modification module 521a modifies one or more parameters of the control scheme 530a based on the estimated size parameter. The second modification module 521b estimates a size parameter of an item conveyed by the motor 540b based on measurements from a motor sensor 595b. When the dual-zone motor control apparatus 520 is in the position hold, the first modification module 521a modifies one or more parameters of the control scheme 530b based on the estimated size parameter.

The dual-zone motor controller apparatus 210 also includes first and second zone controllers 590a, 590b. The first zone controller 590a controls the first motor control module 522a and reports back to the host controller 150. The second zone controller 590b controls the second motor control module 522b and reports back to the host controller 150. The zone controllers 590a and 590b communicate with respective first and second sensors 565a and 565b, which are similar to the sensor system 165 (FIG. 1A).

The first zone controller 590a controls the first motor control apparatus 520a. For example, the first zone controller 590a may issue a command to the first motor control apparatus 520a that causes the first motor control apparatus 520a to generate the first motor driver signal 541a. The zone controller 590a may issue the command based on data from the sensor 565a and/or the host controller 150. For example, the zone controller 590a may issue a start command to the first motor control apparatus 520a when data from the sensor 565a indicates that a package is approaching the zone associated with the motor 540a. The first zone controller 590a also reports information to the host controller 150. For example, the first zone controller 590a may provide a failure indication to the host controller 150 when the first motor control apparatus 520a is in a fault mode. Moreover, the first zone controller 590a and the second zone controller 590b may communicate data or commands with each other directly.

Similarly, the second zone controller 590b controls the second motor control apparatus 520b. The second zone controller 590b may control the second motor control apparatus 520b based on information from the sensor 265b and/or the host controller 150.

The first motor control apparatus 520a includes an electronic processing module 525a, an electronic storage 526a, and an I/O interface 527a. These elements are similar, respectively, to the electronic processing module 125, the electronic storage 126, the I/O interface 127 (FIG. 1A). The first zone controller 590a, the control scheme 530a, the control module 522a, and the modification module 521a are implemented as executable instructions that are stored on the electronic storage 526a and executed by the electronic processing module 525a. In some implementations, the electronic processing module 525a, the electronic storage 526a, and the I/O interface 527a are implemented as a microcontroller.

The second motor control apparatus 520b is configured in a similar manner. The second motor control apparatus 520b includes the second motor control module 522b and the second modification module 521b. The second motor control module 522b implements a control scheme 530b to produce the switching signal 529b. The second motor control apparatus 520b includes an electronic processing module 525b, an electronic storage 526b, and an I/O interface 527b. The second zone controller 590b, the second motor control module 522b, the second modification module 521b, and the second control scheme 530b are implemented with executable instructions that are stored on the electronic storage 526b and executed by the electronic processing module 525a.

As discussed above, the first motor control module 522a produces the switching signal 529a and the second motor control module 522b produces the switching signal 529b. The switching signal 529a is applied to the power converter 524a to produce the motor driver signal 541a. The switching signal 529b is applied to the power converter 524b to produce the motor driver signal 541b. The configurations of the power converters 524a and 524b are discussed next.

The power converter 524a includes a network of switches 528a that have a controllable state arranged to form an inverter. The power converter 524a receives DC power from a DC power source 570. The DC power source 570 may be, for example, a DC link or capacitive network that receives DC power from a rectifier (not shown), or the power source 570 may be a battery. The DC power source 570 is configured to provide an amount of DC power that is appropriate for the application. For example, the DC power source 570 may supply 24 Volt (V) DC power.

The power converter 524a converts the DC power from the source 570 into the motor driver signal 541a by modulating the DC power based on the switching signal 529a with, for example, a pulse width modulation (PWM) technique to modulate the DC power into the motor driver signal 541a. By controlling the power converter 524a with the switching signal 529a, the amplitude, frequency, and phase of the motor driver signal 541a is controlled such that the motor driver signal 541a operates the motor 540a at a particular torque, speed, and direction. The power converter 524b is configured in a similar manner.

The system 500 includes various sensors that monitor and/or measure data related to the motors 540a and 540b and feed the data back to the respective motor drive control 520a and 520b, as discussed below.

The first motor driver signal 541a is monitored by a sensor system 557a. The sensor system 557a includes one or more sensors that are capable of measuring an electrical quantity. For example, the sensor system 557a may include one or more sensors that measure voltage and/or current. The sensor system 557a may include one sensor per phase such that in a three-phase system, the sensor system 557a includes three sensors. The sensor system 557a produces an indication of the amount of an electrical quantity (for example, current and/or voltage) in the first motor driver signal 541a at a point in time and provides the indication to the first motor control apparatus 520a.

Each sensor in the sensor system 557a may be, for example, a Rogowski coil, a Hall effect sensor, a voltage sensor or a shunt resistor that measures the voltage across an element (such as a resistor) that has a known impedance. The sensor system 557a provides the indication to the first motor control module 522a. In some implementations, the three-phase line-to-line voltages are measured by three voltage sensors or estimated/calculated by an algorithm in firmware/software based on measured three-phase currents.

The motor driver signal 541b is measured by a sensor system 557b, which is configured similarly to the sensor system 557a. The sensor system 557b is similar to the sensor system 557a. The sensor system 557b produces an indication of property of an electrical quantity (for example, amplitude and/or phase of voltage and/or current) of the second motor driver signal 541b and provides the indication to the second motor control module 522b.

Output sensors 555a, 555b measure the speed and/or position of the rotors 549a, 549b or produce data from which the speed and/or position of the rotors 549a, 549b, respectively, may be derived. Each output sensor 555a, 555b may be, for example a sensor that measures the speed and/or position of the rotors 549a, 549b. For example, each output sensor 555a, 555b may be an encoder that is mounted to the respective rotor 549a, 549b. In some implementations, each output sensor 555a, 555b includes three Hall effect sensors or other types of sensors. In these implementations, the three sensors transmit a unique pattern of signals for each of 42 angular positions of the rotor.

The system 500 also includes motor sensors 595a and 595b that measure physical properties of the respective motors 540a and 540b during operation. The motor sensors 595a and 595b include electrical sensors and also may include environmental sensors. Examples of electrical sensors include, without limitation, current sensors, power sensors, and voltage sensors. Examples of environmental sensors include, without limitation, temperature sensors (such as thermocouples) and moisture sensors.

The motor sensor 595a provides an indication of an amount of DC current drawn by the motor 540a to the modification module 521a. The motor sensor 595b provides an indication of an amount of DC current drawn by the motor 540b to the modification module 521b. The indication of the amount of DC current drawn by the motors 540a, 540b may be a direct measurement of the current or a measurement from which the amount of DC current may be derived. Examples of measurements from which the amount DC current drawn may be derived include voltage measurements and temperature measurements.

Other implementations are possible. For example, the dual-zone motor control apparatus 520 may be implemented with a sensorless position and speed estimation technique that does not rely on the output sensors 555a and 555b to directly measure the speed and position of the respective motors 540a and 540b. In these implementations, the motor controllers 522a, 522b estimate the speed and/or position of the respective motor 540a, 540b based on properties (for example, phase, frequency, and/or amplitude of voltage and/or current) of the motor driver signal 541a measured by the sensor system 557a and parameters of the respective motor 540a, 540b. Any sensorless speed and estimation technique known in the art may be used in implementations that estimate the speed and position without data from the sensors 555a and 555b.

These and other implementations are within the scope of the claims.

What is claimed is:

1. A control apparatus for a conveying system, the control apparatus comprising:
    a control module configured to control a power converter coupled to a motor; and
    a modification module configured to:
        estimate a size parameter of an item conveyed by the motor;
        determine if a hold command is received; and
        if a hold command is received, modify one or more parameters of the control module based on the estimated size parameter of the item to thereby hold a rotor of the motor at a rotor hold position, wherein the modification module is configured to analyze data from a motor sensor after modifying the one or more parameters and to determine whether a rotor of the motor is oscillating based on the analysis of the data from the motor sensor.

2. The control apparatus of claim 1, wherein the modification module is configured to estimate the size parameter based on a load on the motor while the motor conveys the item.

3. The control apparatus of claim 2, wherein the modification module is configured to estimate the size parameter based on an amount of direct current (DC) current drawn by the motor while the motor conveys the item.

4. The control apparatus of claim 1, wherein the size parameter comprises weight.

5. The control apparatus of claim 1, wherein, if the rotor is oscillating after the one or more parameters are modified, the modification module is configured to make a second modification to one or more parameters of the control module.

6. The control apparatus of claim 1, wherein, after the one or more parameters of the control module is modified, the item does not move.

7. The control apparatus of claim 1, wherein the control module comprises a proportional-integral (PI) controller, and the parameters comprise one or more of an integral windup limit, integral gain coefficient, and a proportional gain coefficient.

8. The control apparatus of claim 1, wherein the hold command is received from a host controller.

9. The control apparatus of claim 1, wherein the control module is configured to control the power converter by providing a switching signal to the power converter, the switching signal being sufficient to cause the power converter to generate a driving signal that, when applied to the motor, controls one or more of torque, speed, and direction of the motor.

10. A method comprising:
    generating a motor driver signal for a motor by controlling a power converter with a switching signal, wherein the switching signal is determined by a control scheme associated with one or more control parameters;
    receiving an indication of a load on the motor as the motor conveys an item through a zone;
    estimating a size parameter of the item based on the indication of the load;
    receiving a hold command when the item is at a location in the zone; and
    after receiving the hold command:
        modifying one or more of the control parameters based on the estimated size parameter, wherein modifying the one or more of the control parameters modifies the motor driver signal such that the motor holds the item at the location in the zone;
        receiving indications of a position of a rotor of the motor over time; and
        determining whether the rotor is oscillating based on the indications of position of the rotor.

11. The method of claim 10, wherein the indication of the load on the motor comprises an amount of direct current (DC) current drawn by the motor as the motor conveys the item through the zone.

12. The method of claim 10, wherein, if the rotor is oscillating, modifying one or more of the control parameters and holding the item at a new location.

13. A system comprising:
a power converter configured to drive a motor, the power converter comprising a plurality of controllable switches; and
a control apparatus comprising:
  a control module configured to generate a switching signal for the power converter, wherein, when applied to the power converter, the switching signal controls a state of the controllable switches to produce a motor driver signal; and
  a modification module configured to:
    determine if a hold command is received while an item is at a location in a zone associated with the motor;
    if a hold command is received: estimate a size parameter of an item conveyed by the motor; and modify one or more parameters of the control module based on the estimated size parameter of the item to modify the motor driver signal such that the motor holds the item at the location, wherein the modification module is further configured to analyze data from a motor sensor after modifying the one or more parameters and to determine whether a rotor of the motor is oscillating based on the analysis of the data from the motor sensor.

14. The system of claim 13, wherein the control module comprises a proportional- integral (PI) controller, and the parameters of the PI controller comprise one or more of an integral windup limit, and integral gain coefficient, and a proportional gain coefficient.

15. The system of claim 13, wherein the control module is configured to control the power converter by providing a switching signal to the power converter, the switching signal being sufficient to cause the power converter to generate a driving signal that, when applied to the motor, controls one or more of torque, speed, and direction of the motor.

16. A control apparatus for a conveying system, the control apparatus comprising:
a control module configured to control a power converter coupled to a motor by providing a switching signal to the power converter, the switching signal being sufficient to cause the power converter to generate a driving signal that, when applied to the motor, controls one or more of torque, speed, and direction of the motor; and
a modification module configured to:
  estimate a size parameter of an item conveyed by the motor;
  determine if a hold command is received; and
  if a hold command is received:
    modify one or more parameters of the control module based on the estimated size parameter of the item,
    produce the switching signal based on the one or more modified parameters, such that, when the driving signal is applied to the motor, a rotor of the motor is held at a rotor hold position.

17. The control apparatus of claim 16, wherein the control module comprises a proportional-integral (PI) controller, and the parameters of the control module comprise one or more of an integral windup limit, and integral gain coefficient, and a proportional gain coefficient.

18. The control apparatus of claim 16, wherein the modification module is configured to estimate the size parameter based on a load on the motor while the motor conveys the item.

19. The control apparatus of claim 16, wherein the modification module is configured to analyze data from a motor sensor after modifying the one or more parameters and to determine whether a rotor of the motor is oscillating based on the analysis of the data from the motor sensor.

20. The control apparatus of claim 16, wherein the modification module is configured to estimate the size parameter based on an amount of direct current (DC) current drawn by the motor while the motor conveys the item.

* * * * *